United States Patent
Kim et al.

(10) Patent No.: US 8,634,036 B2
(45) Date of Patent: Jan. 21, 2014

(54) TRANSFLECTIVE LIQUID CRYSTAL DISPLAY DEVICE WITH BARRIER METAL LAYER BETWEEN OHMIC-CONTACT LAYER AND SOURCE/DRAIN ELECTRODE PATTERNS AND FABRICATION METHOD THEREOF

(75) Inventors: Dong-Yung Kim, Gyeongsangbuk-Do (KR); Byoung-Ho Lim, Gyeongsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 882 days.

(21) Appl. No.: 12/003,437

(22) Filed: Dec. 26, 2007

(65) Prior Publication Data
US 2008/0151159 A1 Jun. 26, 2008

(30) Foreign Application Priority Data
Dec. 26, 2006 (KR) .................. 10-2006-0134202

(51) Int. Cl.
*G02F 1/136* (2006.01)
*G09G 3/36* (2006.01)
*H01L 29/04* (2006.01)

(52) U.S. Cl.
USPC ............. 349/42; 349/43; 345/92; 257/59; 257/72

(58) Field of Classification Search
USPC ........... 349/42–43, 114; 345/92; 257/59, 72
See application file for complete search history.

(56) References Cited

U.S. PATENT DOCUMENTS

| | | | | |
|---|---|---|---|---|
| 4,551,575 A | * | 11/1985 | Takahashi et al. | 136/255 |
| 4,718,751 A | * | 1/1988 | Kamijo et al. | 349/122 |
| 5,539,551 A | * | 7/1996 | Nomoto et al. | 349/42 |
| 6,531,392 B2 | * | 3/2003 | Song et al. | 438/648 |
| 6,917,392 B2 | * | 7/2005 | Hannuki et al. | 349/43 |
| 7,106,400 B1 | * | 9/2006 | Tsuda et al. | 349/113 |
| 7,291,885 B2 | * | 11/2007 | Wu et al. | 257/347 |
| 2002/0000616 A1 | * | 1/2002 | Fukui et al. | 257/359 |
| 2002/0001887 A1 | * | 1/2002 | Sung et al. | 438/156 |
| 2007/0013077 A1 | * | 1/2007 | Lee et al. | 257/762 |

FOREIGN PATENT DOCUMENTS

| | | |
|---|---|---|
| JP | 2000-305110 | 11/2000 |
| JP | 2001-066639 | 3/2001 |

(Continued)

*Primary Examiner* — Hoan C Nguyen
(74) *Attorney, Agent, or Firm* — Morgan, Lewis & Bockius LLP

(57) ABSTRACT

A trans-reflective LCD and a manufacturing method thereof are provided to simplify a manufacturing process and improve yield by reducing the number of masks and implement high definition by preventing wavy noise. A first substrate divided into a pixel unit and first and second pad units is provided. Through a first mask process, a gate electrode and a gate line are formed in the pixel unit of the first substrate. Through a second mask process, an active pattern of an island type is formed on the gate electrode in a state when a first insulating layer is interposed. On the active pattern, an n+ amorphous silicon thin film pattern and a conductive layer pattern are formed. Through a third mask process, a source electrode and a drain electrode are formed in the pixel unit of the first substrate. A data line crosses the gate line to define a pixel area comprising a reflection unit and a transmission unit. Through the third mask process, a pixel electrode comprising a transparent conductive layer is formed in the transmission unit of the pixel area. Through a fourth mask process, a second insulating layer is formed on the first substrate. Through a fifth process, a reflection electrode comprising an opaque conductive layer is formed in the reflection unit of the pixel area. The first substrate is deposited with a second substrate.

12 Claims, 14 Drawing Sheets

(56) References Cited

FOREIGN PATENT DOCUMENTS

| JP | 2001-201768 | 7/2001 |
| JP | 2005-157017 | 6/2005 |
| KR | 1020020067885 | 8/2002 |
| KR | 1020020092722 | 12/2002 |
| KR | 1020040086946 | 10/2004 |
| KR | 1020060078579 | 7/2006 |

* cited by examiner

TRANSFLECTIVE LIQUID CRYSTAL
DISPLAY DEVICE WITH BARRIER METAL
LAYER BETWEEN OHMIC-CONTACT
LAYER AND SOURCE/DRAIN ELECTRODE
PATTERNS AND FABRICATION METHOD
THEREOF

CROSS-REFERENCE TO RELATED
APPLICATION

The present application claims priority under 35 U.S.C. 119 and 35 U.S.C. 365 to Korean Patent Application No. 10-2006-0134202 filed on Dec. 26, 2006, which is hereby incorporated by reference in its entirety.

BACKGROUND OF THE INVENTION

1. Field of the Invention

Embodiments of the present invention relate to a display device and, more particularly, to a transflective liquid crystal display (LCD) device and a fabrication method thereof. Although embodiments of invention are suitable for a wide scope of applications, it is particularly suitable for simplifying a fabrication process and improving production yield by reducing the number of masks and also suitable for implementing high picture quality by preventing generation of wavy noise.

2. Description of the Related Art

As the consumer's interest in information displays is growing and the demand for portable (mobile) information devices is increasing, research and commercialization of light and thin flat panel displays ("FPD") has increased.

Among FPDs, the liquid crystal display ("LCD") is a device for displaying images by using optical anisotropy of liquid crystal. LCD devices exhibit excellent resolution and color and picture quality, so it is widely used for notebook computers or desktop monitors, and the like.

The LCD includes a color filter substrate, an array substrate and a liquid crystal layer formed between the color filter substrate and the array substrate.

An active matrix (AM) driving method commonly used for the LCD is a method in which liquid crystal molecules in a pixel part are driven by using amorphous silicon thin film transistors (a-Si TFTs) as switching elements.

In the fabricating process of the LCD, a plurality of masking processes (namely, photographing processes) are performed to fabricate the array substrate including the TFTs, so a method for reducing the number of masking process will increase productivity.

The general structure of the LCD will now be described in detail with reference to FIG. 1.

FIG. 1 is an exploded perspective view showing a general LCD.

As shown in FIG. 1, the LCD includes a color filter substrate 5, an array substrate 10 and a liquid crystal layer 30 formed between the color filter substrate 5 and the array substrate 10.

The color filter substrate 5 includes a color filter (C) including a plurality of sub-color filters 7 that implement red, green and blue colors, a black matrix 6 for dividing the sub-color filters 7 and blocking light transmission through the liquid crystal layer 30, and a transparent common electrode 8 for applying voltage to the liquid crystal layer 30.

The array substrate 10 includes gate lines 16 and data lines 17 which are arranged vertically and horizontally to define a plurality of pixel regions (P), TFTs, switching elements, formed at respective crossings of the gate lines 16 and the data lines 17, and pixel electrodes 18 formed on the pixel regions (P).

The color filter substrate 5 and the array substrate 10 are attached in a facing manner by a sealant (not shown) formed at an edge of an image display region to form a liquid crystal panel, and the attachment of the color filter substrates 5 and the array substrate 10 is made by an attachment key formed on the color filter substrate 5 or the array substrate 10.

The general LCD expresses an image by light emitted from a light source such as a backlight positioned at a lower portion of a liquid crystal panel. However, the actual amount of light transmitted through the liquid crystal panel is about 7% of the light generated by the backlight, causing severe loss of light, so power consumption by the backlight is high.

Recently, to solve the problem of the high power consumption, a reflective LCD that does not use such a backlight has been studied. The transflective LCD uses natural light as a means for expressing an image, without such power consumption caused by the backlight, so it can be used in a carried-around state for a long time.

Unlike an existing transmissive LCD, the reflective LCD uses an opaque material having reflectivity characteristics at a pixel region to reflect light made incident from an external source to thus express an image.

However, because natural or an artificial light source does not exist always, the reflective LCD can be used during day time when natural light is present or in an office or in a building where an external artificial optical source is provided. Namely, the reflective LCD cannot be used in a dark environment in which natural light is not present.

To solve the problem, a transflective LCD, which combines the advantages of the reflective LCD using natural light and the transmissive LCD that uses a backlight, is being actively studied. The transflective LCD can be changed to a reflective mode and a transmissive mode according to a user intention, and light of the backlight, an external natural light source or an artificial light source can be all used, so power consumption can be reduced without being limited to the surrounding environments.

FIGS. 2A to 2F are cross-sectional views sequentially showing a fabrication process of an array substrate of the general transflective LCD.

As shown in FIG. 2A, a gate electrode 21 made of a conductive material is formed by using a photolithography process (a first masking process) on a substrate.

Next, as shown in 2B, a first insulation film 15a, an amorphous silicon thin film and an n+ amorphous silicon thin film are sequentially deposited over the entire surface of the substrate 10 with the gate electrode 21 formed thereon, and the amorphous silicon thin film and the n+ amorphous silicon thin film are selectively patterned by using the photolithography process (a second masking process) to form an active pattern 24 formed of the amorphous silicon thin film on the gate electrode 21.

In this case, the n+ amorphous silicon thin film pattern 25 which has been patterned in the same form as the active pattern 24 is formed on the active pattern 24.

Thereafter, as shown in FIG. 2C, a conductive metal material is deposited over the entire surface of the array substrate 10 and then selectively patterned by using the photolithography process (a third masking process) to form a source electrode 22 and a drain electrode 23 at an upper portion of the active pattern 24. At this time, a certain portion of the n+ amorphous silicon thin film pattern formed on the active pattern 24 is removed through the third masking process to form an ohmic-contact layer 25' between the active pattern 24 and the source and drain electrodes 22 and 23.

Subsequently, as shown in FIG. 2D, a second insulation film 15b, namely, an organic insulation film such as acryl, is deposited over the entire surface of the array substrate 10 with the source electrode 22 and the drain electrode 23 formed thereon, and a portion of the second insulation film 15b is removed through the photolithography process (a fourth masking process) to form a contact hole 40 exposing a portion of the drain electrode 23.

In this case, as shown, the surface of the second insulation film 15b is formed to be irregular (i.e., uneven, rough, jagged, bumpy, undulated, wavy, rippled, furrowed, ruffed, indented, serrated, etc.) to enhance reflection efficiency in the reflective mode.

As shown in FIG. 2E, a conductive metal material having good reflectivity is deposited over the entire surface of the array substrate 10 with the second insulation film 15b formed thereon, and then selectively patterned by using the photolithography process (a fifth making process) to form a reflective electrode 18b electrically connected with the drain electrode 23 via the contact hole 40.

As shown in FIG. 2F, a transparent conductive metal material is deposited over the entire surface of the array substrate 10, and then, a pixel electrode 18a is formed over the entirety of the pixel region including a reflective part where the reflective electrode 18b has been formed, by using a photolithography process (a sixth masking process).

As mentioned above, in fabricating the array substrate including TFTs of the general transflective LCD, a total of six photolithography processes are necessarily performed. That is, the general transflective LCD requires more photolithography processes compared to that of the transmissive LCD.

The photolithography process is a process of transferring a pattern formed on a mask onto the substrate on which a thin film is deposited to form a desired pattern, which includes a plurality of processes such as a process of coating a photosensitive solution, an exposing process and a developing process, etc., which, thus, degrades a production yield.

In particular, because the masks designed for forming the pattern are quite expensive, as the number of masks used in the processes increases, the fabrication cost of the LCD increases proportionally.

A technique for fabricating the array substrate by performing the masking process four times by forming the active pattern and the source and drain electrodes using a single masking process having a slit (diffraction) mask has been proposed.

However, because the active pattern, the source and drain electrodes and the data lines are simultaneously patterned by performing an etching process twice with the slit mask, the active pattern protrusively remains near the lower portions of the source electrode, the drain electrode and the data lines.

The protrusively remaining active pattern is formed of an intrinsic amorphous silicon thin film, so the protrusively remaining active pattern is exposed to light from the lower backlight, generating an optical current. The amorphous silicon thin film reacts slightly to a blinking of the light from the back light, and repeatedly becomes activated and deactivated, which causes a change in the optical current. The changing optical current component is coupled with a signal flowing in the neighboring pixel electrodes so as to distort movement of the liquid crystal molecules positioned at the pixel electrodes. As a result, a wavy noise is generated such that a wavy fine line appears on a screen of the LCD.

In addition, because the active pattern positioned at the lower portion of the data lines has portions that protrude at a certain height from both sides of the data lines, the opening region of the pixel part is encroached by as much as the protrusion height, thus resulting in a reduction in an aperture ratio of the LCD.

SUMMARY OF THE INVENTION

Accordingly, embodiments of the invention are directed to a liquid crystal display (LCD) and its fabrication method that substantially obviate one or more of the problems due to limitations and disadvantages of the related art.

An object of the embodiments of the invention is to provide a transflective liquid crystal display (LCD) and its fabrication method capable of fabricating an array substrate by performing a masking process five times.

Another object of the embodiments of the invention is to provide a transflective LCD and its fabrication method capable of implementing high picture quality without generating a wavy noise.

Still another object of the embodiments of the invention is to provide a transflective LCD and its fabrication method capable of implementing high luminance by extending an opening region and solving an adhesion problem between a pixel electrode formed of a transparent conductive film and an organic film.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims thereof as well as the appended drawings.

To achieve these and other advantages and in accordance with the purpose of embodiments of the invention, as embodied and broadly described, a transflective liquid crystal display (LCD) includes: a first substrate divided into a pixel part and first and second pad parts; a gate electrode and a gate line formed at the pixel part of the first substrate; a first insulation film formed on the first substrate; an active pattern formed as an island at an upper portion of the gate electrode and having a width smaller than the gate electrode; an ohmic-contact layer and a barrier metal layer formed on the first substrate and on source and drain regions of the active pattern; source and drain electrodes formed at the pixel part of the first substrate and electrically connected with the source and drain regions of the active pattern via the ohmic-contact layer and the barrier metal layer; a data line formed at the pixel part of the first substrate and crossing the gate line to define a pixel region including a reflective portion and a transmissive portion; a pixel electrode formed at the transmissive portion of the pixel region and electrically connected with the drain electrode; a source electrode pattern, a drain electrode pattern and a data line pattern formed at lower portions of the source electrode, the drain electrode and the data line, and formed of a conductive film that forms the pixel electrode; a reflective electrode formed at the reflective portion of the pixel region and electrically connected with the drain electrode and the pixel electrode; a second insulation film exposing the pixel electrode of the pixel region; and a second substrate attached to the first substrate in a facing manner.

To achieve these and other advantages and in accordance with the purpose of embodiments of the invention, as embodied and broadly described, a method for fabricating a transflective LCD includes: providing a first substrate divided into a pixel part and first and second pad parts; forming a gate electrode and a gate line at the pixel part of the first substrate;

forming a first insulation film on the first substrate; forming an active pattern as an island at an upper portion of the gate electrode and forming an n+ amorphous silicon thin film pattern and a conductive film pattern on the active pattern; forming source and drain electrodes at the pixel part of the first substrate and forming a data line crossing the gate line to define a pixel region including a reflective portion and a transmissive portion; forming a pixel electrode formed of a transparent conductive film at the transmissive portion of the pixel region; forming a second insulation film on the first substrate; forming a reflective electrode formed of an opaque conductive film at the reflective portion of the pixel region; and attaching the first and second substrates.

It is to be understood that both the foregoing general description and the following detailed description are exemplary and explanatory and are intended to provide further explanation of embodiments as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.
In the Drawings.

DETAILED DESCRIPTION OF THE PREFERRED EMBODIMENTS

The transflective liquid crystal display (LCD) and its fabrication method will now be described in detail with reference to the accompanying drawings.

Figure 1:
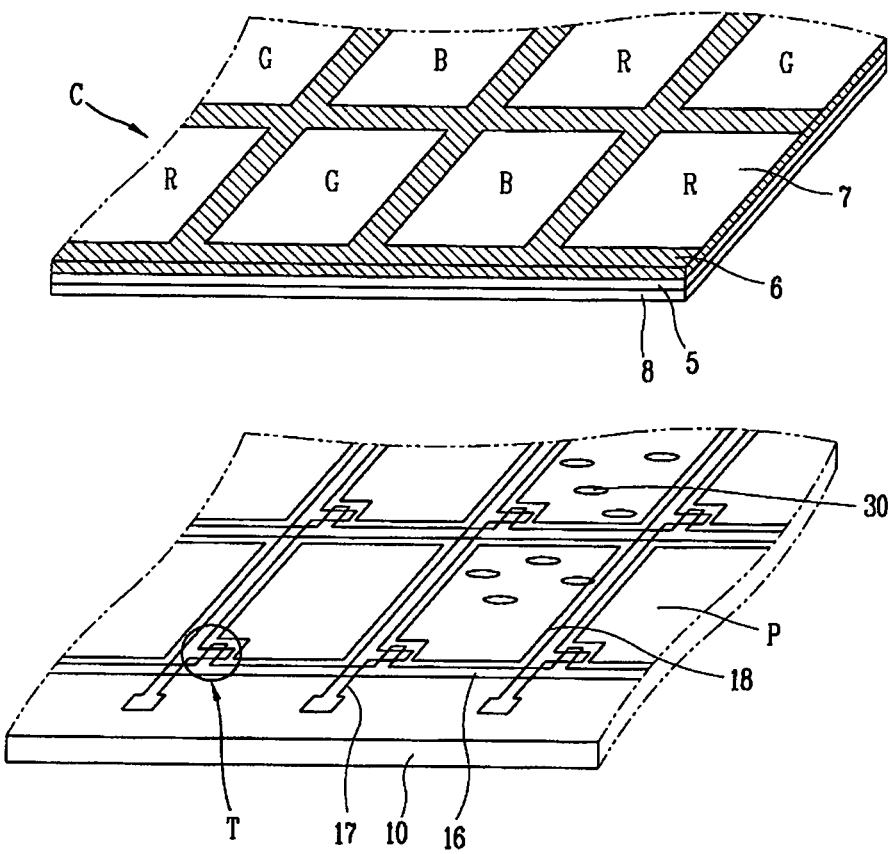
FIG. 1 is an exploded perspective view showing a general liquid crystal display (LCD)
Figure 2A:
FIGS. 2A to 2F are cross-sectional views sequentially showing a fabrication process of an array substrate of a general transflective LCD.
Figure 2B:
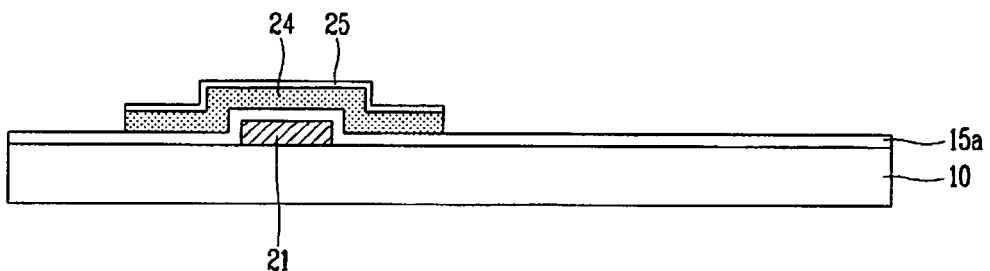
Figure 2C:
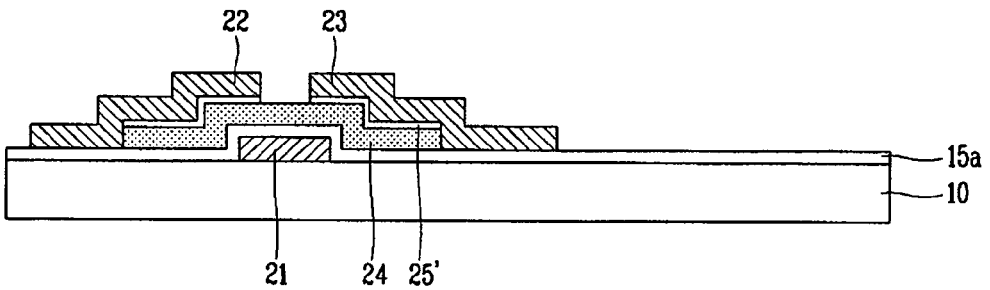
Figure 2D:
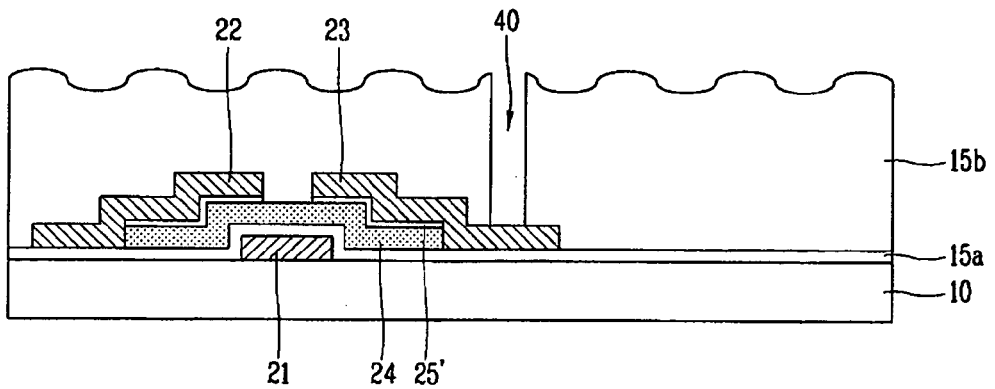
Figure 2E:
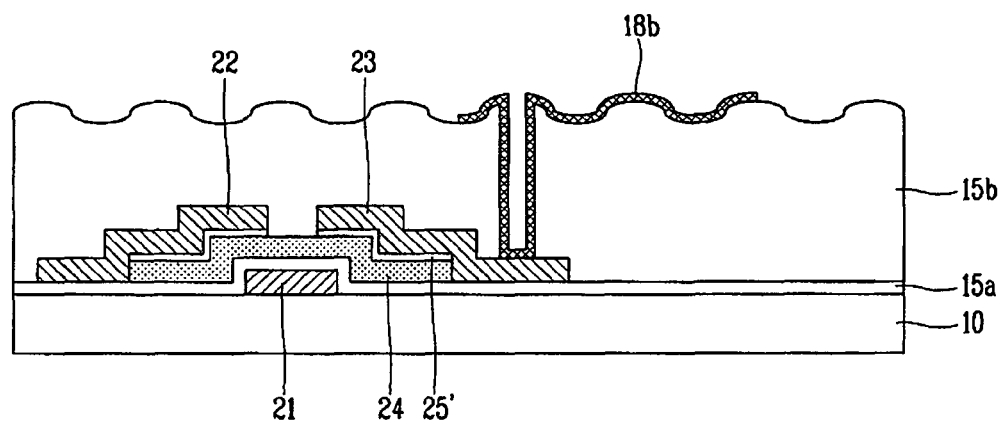
Figure 2F:
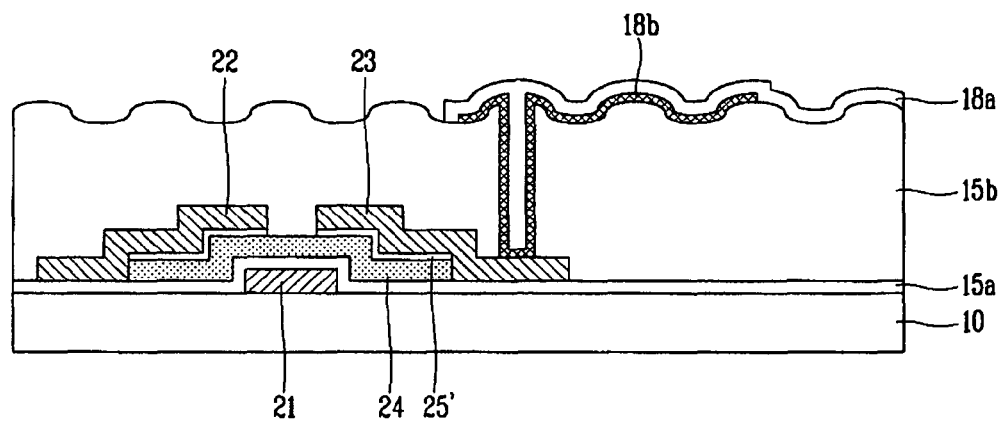
Figure 3:
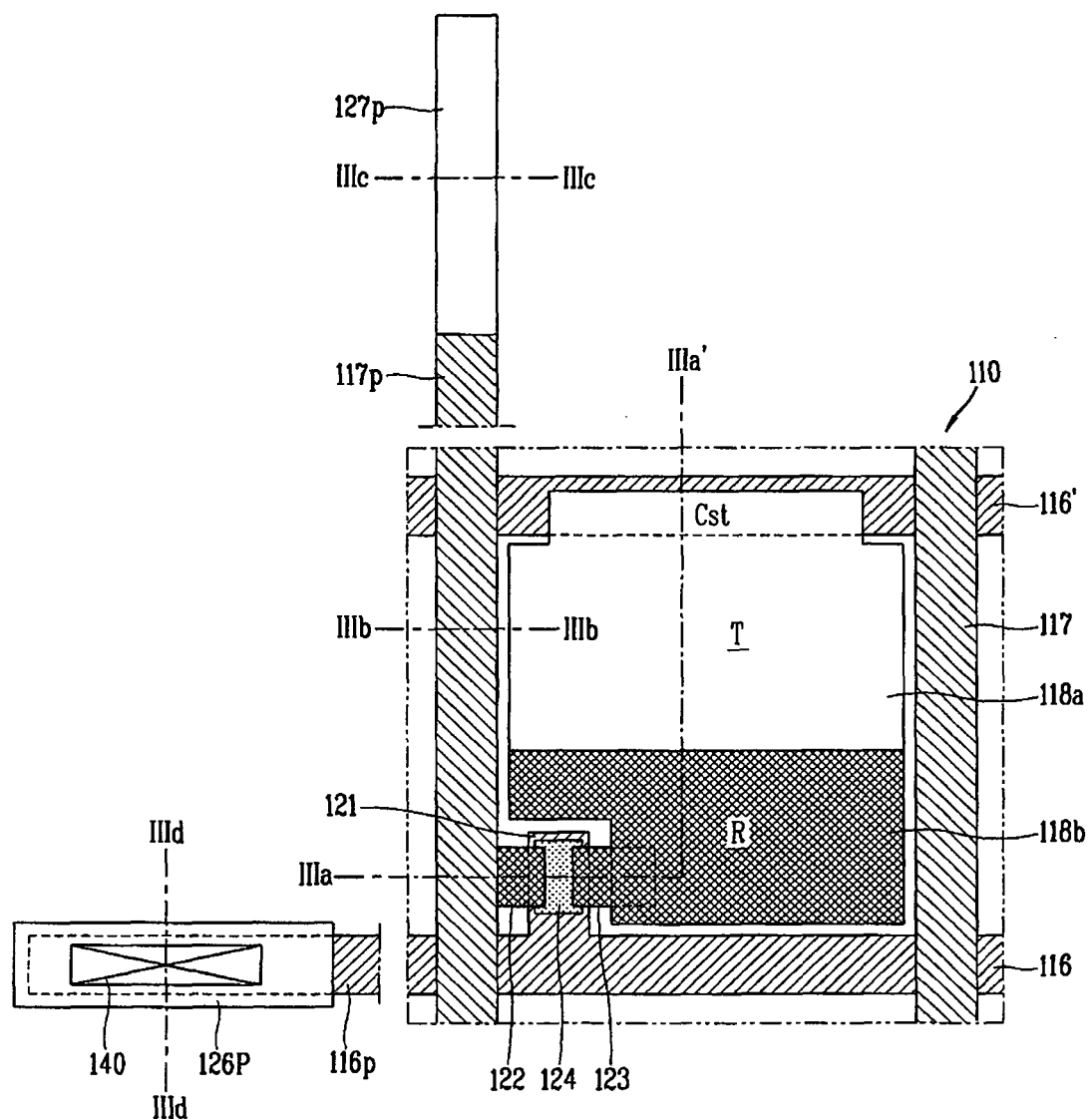
FIG. 3 is a plan view showing a portion of an array substrate of a transflective LCD according to the embodiment of the present invention.

FIG. 3 is a plan view showing a portion of an array substrate of the transflective LCD according to the embodiment of the present invention, in which a single pixel including a gate pad part and a data pad part are shown for the sake of explanation.

Actually, the N number of gate lines and the M number of data lines are formed to cross each other to define the M×N number of pixels. To simplify the explanation, only a single pixel is shown.

As shown, gate lines 116 and the data lines are formed to be arranged vertically and horizontally to define the pixel region on an array substrate 110. A thin film transistor (TFT), a switching element, is formed at a crossing of the gate line 116 and the data line 117. A pixel electrode 118a and a reflective electrode 118b are formed within the pixel region, is connected with the TFT to drive liquid crystal (not shown) together with a common electrode of a color filter substrate (not shown).

The pixel region refers to an image display region defined as the gate line 116 and the data line 117 cross, and includes a reflective portion (R) where the reflective electrode 118b is formed to implement a reflective mode and a transmissive portion (T) where the pixel electrode 118a is formed to implement a transmissive mode. Namely, with the reflective portion (R) and the transmissive portion (T) in the pixel region, light made incident on from the exterior is reflected by the reflective electrode 118b in the reflective mode so as to be emitted to the exterior to display an image, and light emitting from a backlight is transmitted through the pixel electrode 118a in the transmissive mode to display an image.

A gate pad electrode 126p and a data pad electrode 127p are formed at edge portions of the array substrate 110 and electrically connected with the gate line 116 and the data line 117, and transfer a scan signal and a data signal applied from an external driving circuit unit (not shown) to the gate line 116 and the data line 117, respectively.

Namely, the gate line 116 and the data line 117 extend to the driving circuit unit so as to be connected with the corresponding gate pad line 116p and the data pad line 117p, and the gate pad line 116p and the data pad line 117p receive the scan signal and the data signal from a driving circuit unit through the gate pad electrode 126p and the data pad electrode 127p electrically connected with the gate pad line 116p and the data pad line 117p. Herein, reference numeral 140 denotes a gate pad part contact hole, and the gate pad electrode 126p is electrically connected with the gate pad line 117p via the gate pad part contact hole 140.

The TFT includes a gate electrode 121 connected with the gate line 116, a source electrode 122 connected with the data line 117, and a drain electrode 123 connected with the pixel electrode 118a and the reflective electrode 118b. The TFT also includes an active pattern 124 for forming a conductive channel between the source and drain electrodes 122 and 123 by a gate voltage supplied to the gate electrode 121.

In the embodiment of the present invention, the active pattern 124 is formed of an amorphous silicon thin film, and is formed as an island at an upper portion of the gate electrode 121 to thus reduce an off current of the TFT.

At a lower portion of the source electrode 122, the drain electrode 123 and the data line 117 made of an opaque conductive material, there are formed a source electrode pattern (not shown), a drain electrode pattern (not shown) and a data line pattern (not shown) made of a transparent conductive material and patterned in the same form as the source electrode 122, the drain electrode 123 and the data line 117.

Although not shown in detail, the reflective electrode 118b formed of an opaque conductive film is formed on a second insulation film formed of an organic film and having a bumpy surface.

In the embodiment of the present invention, because the pixel electrode 118a, the source electrode pattern, the drain electrode pattern and the data line pattern formed of a transparent conductive film are formed below the source electrode, the drain electrode 123 and the data line 117, and the second insulation firm is formed above the source electrode 122, the drain electrode 123 and the data line 117, so there is no adhesion problem between the second insulation film and the transparent conductive film. Namely, there is an adhesion problem between the second insulation film formed of the organic film and the transparent conductive film made of ITO or IZO, so plasma processing should be necessarily performed in forming the second insulation film having the bumpy surface. But in the embodiment of the present invention, because the pixel electrode 118a, the source electrode pattern, the drain electrode pattern and the data line pattern, which are formed of the transparent conductive film, are formed below the source electrode 122, the drain electrode 123, and the data line 117, so the adhesion problem between the second insulation film and the transparent conductive film can be basically avoided.

A portion of the source electrode 122 extends in one direction to form a portion of the data line 117, and a portion of the drain electrode pattern extends to the pixel region to form the pixel electrode 118.

A portion of the previous gate line 116' overlaps with a portion of the pixel electrode 118 with a first insulation film (not shown) interposed therebetween to form a storage capacitor Cst. The storage capacitor Cst serves to uniformly maintain voltage applied to a liquid crystal capacitor until a next signal is received. Namely, the pixel electrode 118 of the array substrate 110 forms the liquid crystal capacitor together with the common electrode of the color filter substrate, and in general, voltage applied to the liquid crystal capacitor is not maintained until the next signal is received but leaked. Thus, in order to uniformly maintain the applied voltage, the storage capacitor Cst should be connected with the liquid crystal capacitor.

Besides maintaining the signal, the storage capacitor may also have the effect of stabilizing a gray scale display, reducing flickering effects, reducing the formation of residual images, and the like.

In the LCD according to the embodiment of the present invention, the source and drain electrodes 122 and 123, the pixel electrode 118 and the pad part electrodes 126p and 127p are patterned and also the pixel region and the pad part form an opening using a single mask such that the array substrate 110 can be fabricated by performing the masking process a total of fifth times using four masks. The fabrication method of the LCD will now be described as follows.

FIGS. 4A to 4H are cross-sectional views sequentially showing a fabrication process taken along lines IIIa-IIIa', IIIb-IIIb' and IIIc-IIIc' of the array substrate in FIG. 3. The left side shows the process of fabricating the array substrate of the pixel part and the right side shows the sequential process of fabricating the array substrate of the data pad part and the gate pad part.

FIGS. 5A to 5E are plan views sequentially showing the fabrication process of the array substrate in FIG. 3.

Figure 4A:
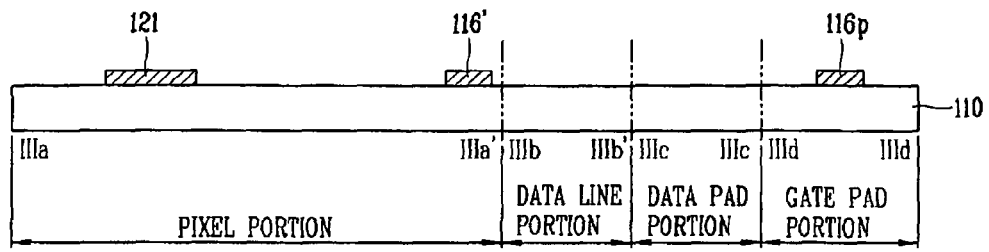
FIGS. 4A to 4H are cross-sectional views sequentially showing a fabrication process taken along lines IIIa-IIIa', IIIb-IIIb and IIIc-IIIc of the array substrate in FIG. 3.
Figure 5A:
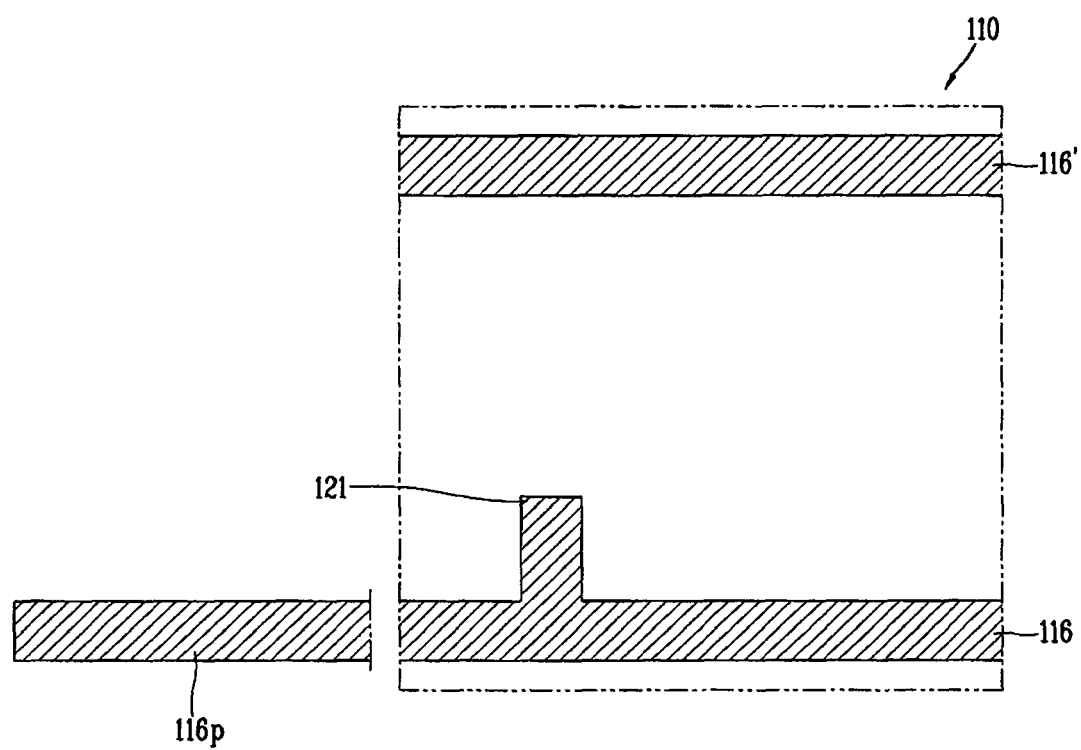
FIGS. 5A to 5E are plan views sequentially showing the fabrication process of the array substrate in FIG. 3.

As shown in FIGS. 4A and 5A, the gate electrode 121 and gate lines 116 and 116' on the pixel part of the array substrate 110 made of a transparent insulation material such as glass, and the gate pad line 116p is formed on the gate pad part of the array substrate 110.

Reference numeral 116' refers to the previous gate line with respect to a corresponding pixel, and the gate line 116 of the corresponding pixel and the previous gate line 116' are formed in the same manner.

In this case, the gate electrode 121, the gate lines 116 and 116' and the gate pad line 116p are formed by depositing a first conductive film over the entire surface of the array substrate 110 and selectively patterning it through the photolithography process (the first masking process).

Herein, the first conductive film can be made of a low-resistance opaque conductive material such as aluminum (Al), an aluminum alloy, tungsten (W), copper (Cu), chromium (Cr) and molybdenum (Mo), and the like. Also, the first conductive film can be formed with a multi-layered structure by stacking two or more low-resistance conductive materials.

Figure 4B:
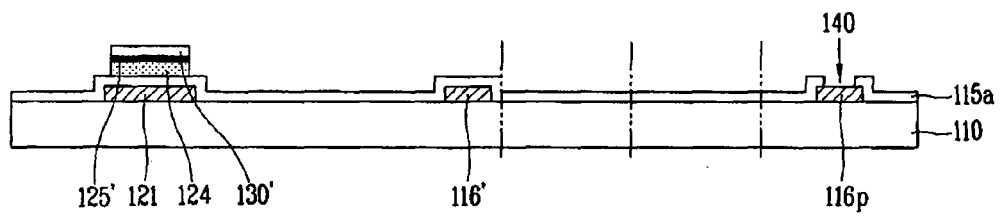
Figure 5B:
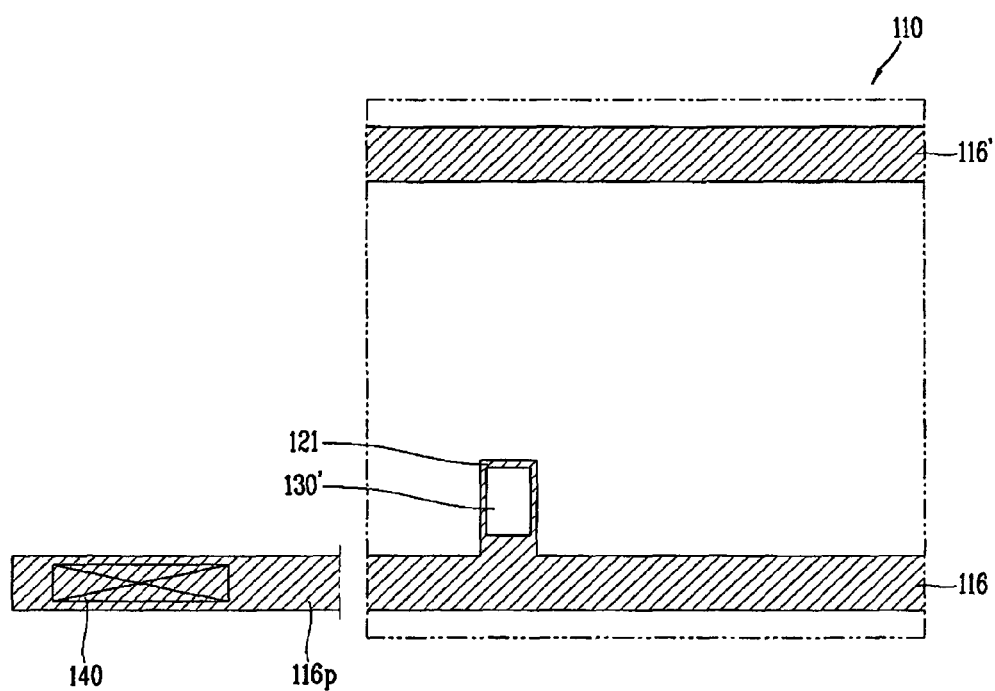

Next, as shown in FIGS. 4B and 5B, a first insulation film 115a, an amorphous silicon thin film, an n+ amorphous silicon thin film and a second conductive film are formed over the entire surface of the array substrate 110 of the array substrate 110 with the gate electrode 121, the gate lines 116 and 116' and the gate pad line 116p formed thereon, and then selectively removed through the photolithography process (a second masking process) to form an active pattern 124 formed of the amorphous silicon thin film at an upper portion of the gate electrode 121 and at the same time to form a gate pad part contact hole 140 exposing a portion of the gate pad line 116p.

An n+ amorphous silicon thin film pattern 125' and a conductive film pattern 130', which are formed of the n+ amorphous silicon thin film and the second conductive film and have the same pattern as the active pattern 124, remain on the active pattern 124.

In the embodiment of the present invention, the gate pad part contact hole 140 is formed long in a direction substantially parallel to the gate pad line 116p. However, the present invention can be applicable regardless of the configuration of the gate pad part contact hole 140.

Herein, in the embodiment of the present invention, the active pattern 124 is formed as an island over the gate electrode 121 and within the boundaries defined by the perimeter of the gate electrode 121 with the first insulation film 115a interposed therebetween, and the active pattern 124 and the gate pad part contact hole 140 are formed using a single mask, such as a half-tone mask or a diffraction (slit) mask (hereinafter, it is assumed that referring to the half-tone mask means it also includes the diffraction mask). The second masking process will now be described in detail as follows.

FIGS. 6A to 6F are cross-sectional views showing a second masking process in detail in FIGS. 4B and 5B.

Figure 6A:
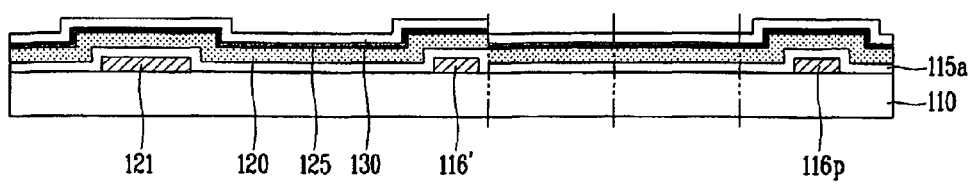
FIGS. 6A to 6F are cross-sectional views substantially showing a second masking process in FIGS. 4B and 5B.

As shown in FIG. 6A, the first insulation film 115a, the amorphous silicon thin film 120, the n+ amorphous silicon thin film 125 and the second conductive film 130 are formed over the entire surface of the array substrate 110 with the gate electrode 121, the gate lines 116 and 116' and the gate pad line 116p formed thereon.

In this case, the second conductive film 130 is used as a barrier metal layer that reduces contact resistance between an ohmic-contact layer formed on the n+ amorphous silicon thin film and source/drain electrode patterns formed of a transparent conductive film (to be described), and can be formed with a thickness of about 50 Å-100 Å by using a conductive material such as molybdenum.

Figure 6B:
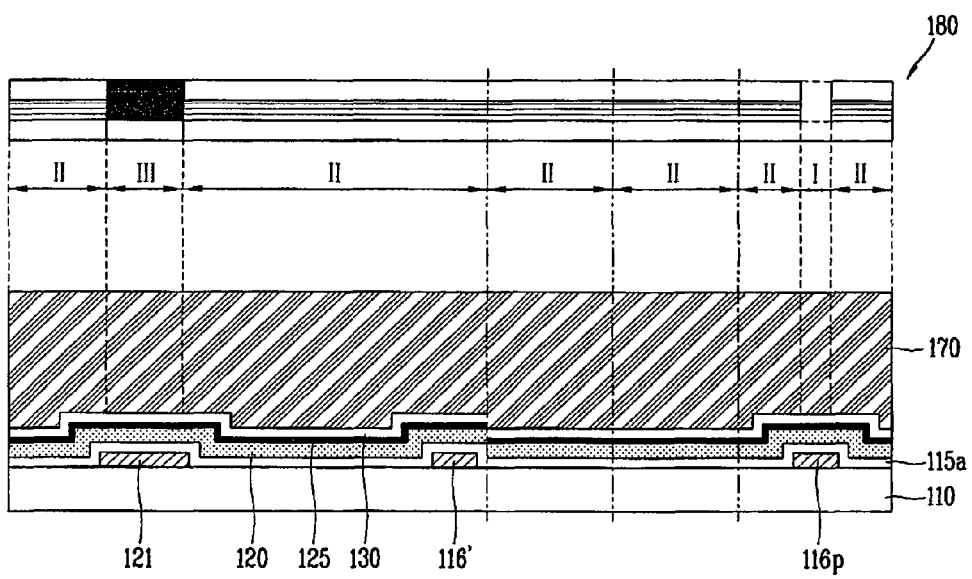

Thereafter, as shown in FIG. 6B, a first photosensitive film 170 made of a photosensitive material such as photoresist is formed over the entire surface of the array substrate 110, on which light is selectively irradiated through the half-tone mask 180.

The half-tone mask 180 used in the embodiment of the present invention includes a first transmission region (I) that allows irradiated light to be entirely transmitted therethrough, a second transmission region (II) that allows only light to be partially transmitted therethrough while blocking the remaining light, and a blocking region (III) that entirely blocks the irradiated light. Only light which has transmitted through the half-tone mask 180 can be irradiated onto the first photosensitive film 170.

Figure 6C:
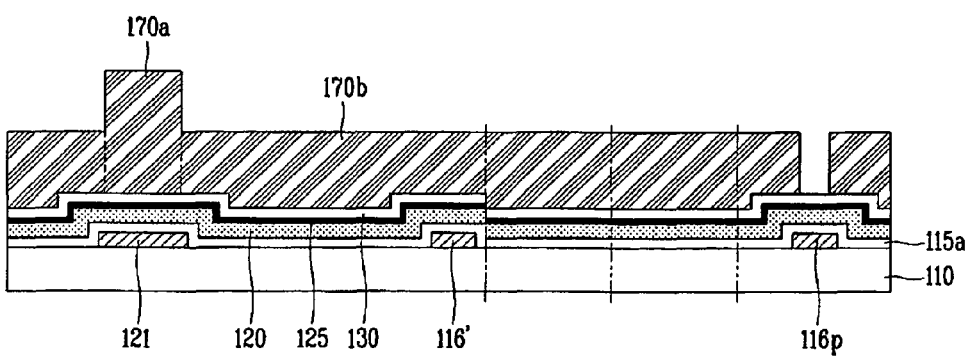

Subsequently, when the first photosensitive film 170 which has been exposed through the half-tone mask 180 is developed, as shown in FIG. 6C, first and second photosensitive film patterns 170a and 170b remain at regions where light has been entirely blocked or partially blocked through the blocking region (III) and the second transmission region (II), and the first photosensitive film at the transmission region (I) through which light had been entirely transmitted has been completely removed to expose the surface of the second conductive film 130.

At this time, the first photosensitive film pattern 170a formed at the blocking region III is thicker than the second photosensitive film pattern 170b formed through the second transmission region II. In addition, the photosensitive film at the region where the light had entirely transmitted through the first transmission region I has been completely removed. This is because positive photoresist has been used. However, negative photoresist can be also used in the embodiments of the present invention.

Figure 6D:
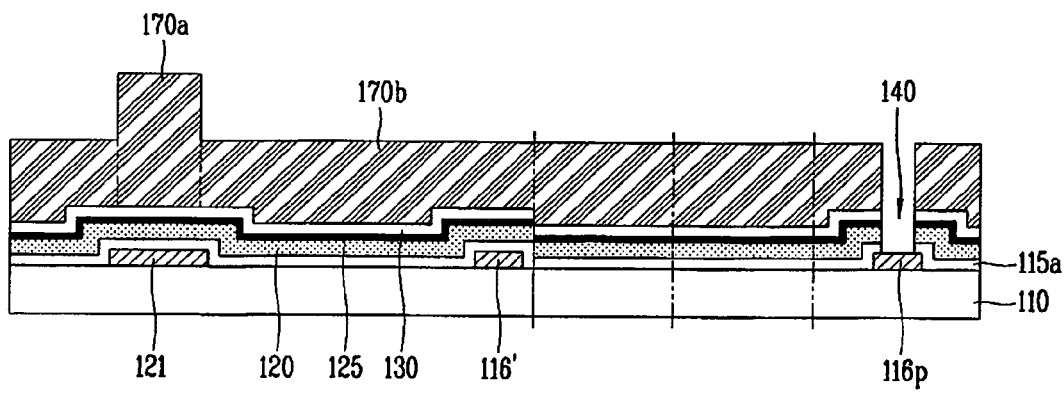

Thereafter, as shown in FIG. 6D, the first insulation film 115a, the amorphous silicon thin film 120, the n+ amorphous silicon thin film 125 and the second conductive film 130 are selectively removed by using the first and second photosensitive film patterns 170a and 170b as masks to form the gate pad part contact hole 140 exposing a portion of the gate pad line 116p at the gate pad part of the array substrate 110.

Figure 6E:
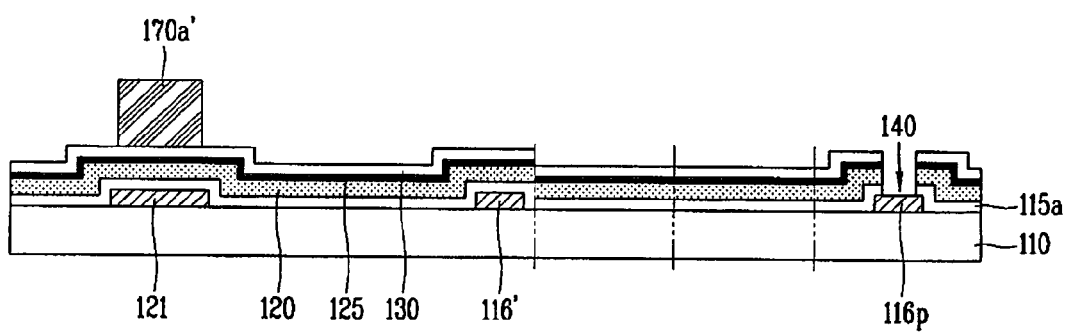

Then, an ashing process is performed to remove a portion of the first photosensitive film pattern 170a and the entirety of the second photosensitive film pattern 170b. Then, as shown in FIG. 6E, the second photosensitive film pattern of the second transmission region II is completely removed.

In this case, the first photosensitive film pattern remains as a third photosensitive film pattern 170' by removing the thickness of the second photosensitive film pattern only at the active pattern region corresponding to the blocking region III.

Figure 6F:
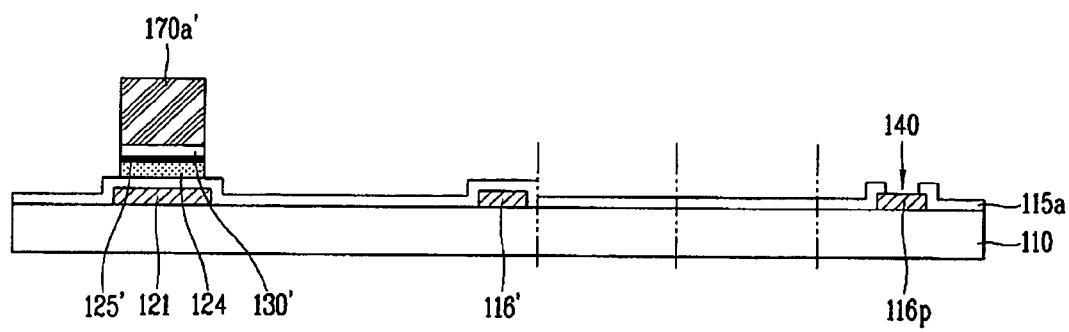

Thereafter, as shown in FIG. 6F, portions of the amorphous silicon thin film, the n+ amorphous silicon thin film and the second conductive film are removed by using the remaining third photosensitive film pattern 170' as a mask to form the active pattern 124 as an island over the gate electrode 121 and within boundaries defined by the perimeter of the gate electrode 121 to thus reduce an off current of the TFT.

At this time, the n+ amorphous silicon thin film pattern 125' and the conductive film pattern 130', which are formed of the n+ amorphous silicon thin film and the second conductive film and have been patterned in the same form as the active pattern 124, remain at the upper portion of the active pattern 124.

In the embodiment of the present invention, the active pattern 124 is formed as an island over the gate electrode 121 and within boundaries defined by the perimeter of the gate electrode 121 to thus reduce an off current of the TFT.

Figure 4C:
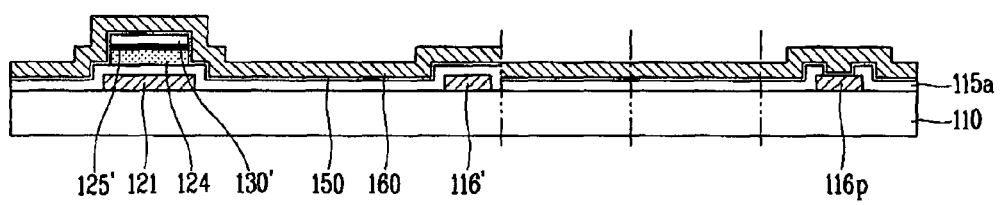
Figure 4D:
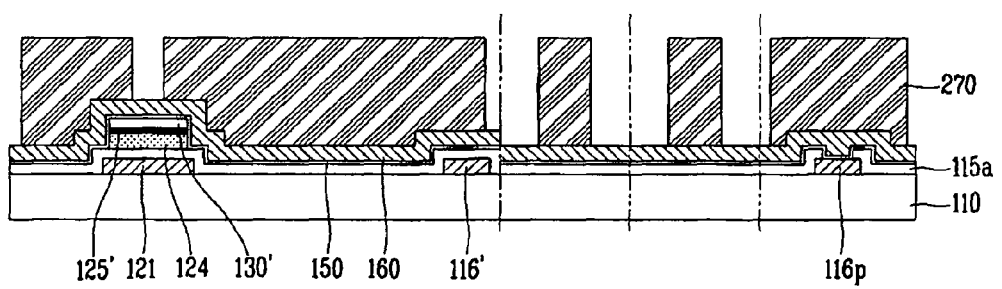

Next, as shown in FIGS. 4C and 4D, third and fourth conductive films 150 and 160 are deposited over the entire surface of the array substrate 110 with the active pattern 124 formed thereon.

A second photosensitive film 270, which has been patterned to have a certain form, is formed on the array substrate 110 (a third masking process).

Figure 4E:
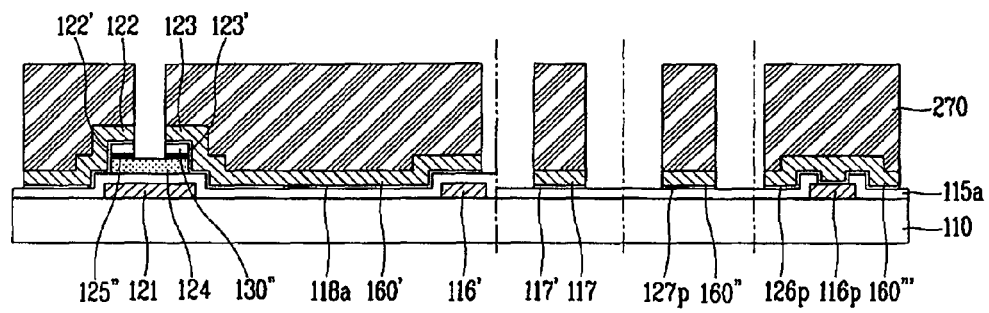
Figure 5C:
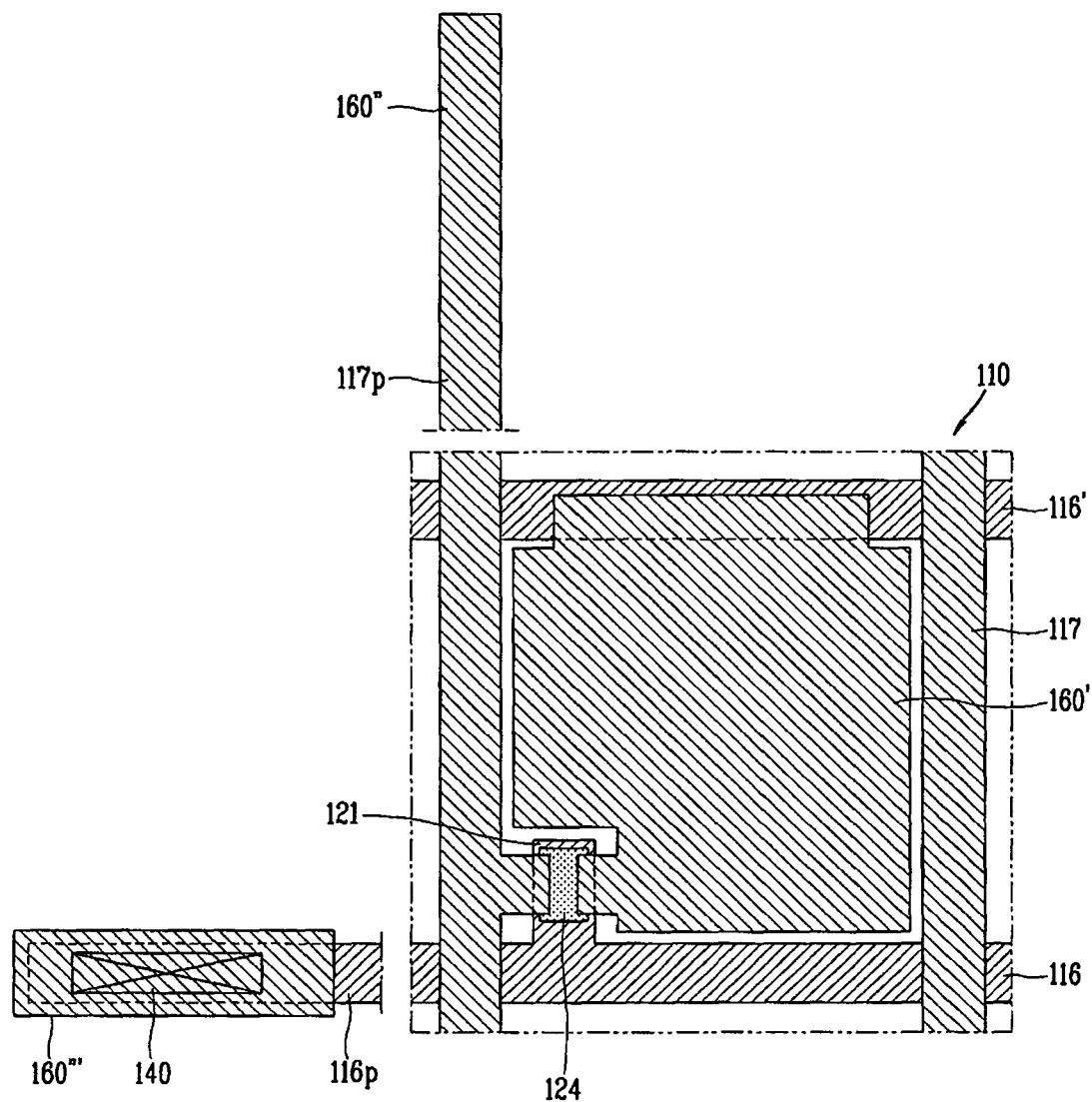

Thereafter, as shown in FIGS. 4E and 5C, portions of the third and fourth conductive films 150 and 160 are removed by using the second photosensitive film 270 as a mask to form the pixel electrode 118 formed of the third conductive film and at the same time to form the source electrode 122, the drain electrode 123 and the data line 117 formed of the fourth conductive film at the pixel part of the array substrate 110.

In addition, through the third masking process, the data pad electrode 127p and the gate pad electrode 126p, which are formed of the third conductive film, are formed at the data pad part and the gate pad part of the array substrate 110.

In this case, on the lower part of the source electrode 122, the drain electrode 123 and the data line 117, there are formed a source electrode pattern 122', a drain electrode pattern 123' and a data line pattern (not shown) are formed from the third conductive film and patterned according to the shape of the source electrode 122, the drain electrode 123 and the data line 117.

In addition, a pixel electrode pattern 160', a data pad electrode pattern 160" and a gate pad electrode pattern 160'" formed of a fourth conductive film and patterned according to the shape of the pixel electrode 118, the data pad electrode 127p and the gate pad electrode 126p remain at the upper portions of the pixel electrode 118, the data pad electrode 127p and the gate pad electrode 126p.

A certain region of the n+ amorphous silicon thin film pattern 125' formed on the active pattern 124 is removed through the third masking process to form an ohmic-contact layer 125" that allows the active pattern 124 and the source and drain electrodes 122 and 123 to ohmic-contact with each other, and a barrier metal layer 130" made of the second conductive film and patterned in the same form as the ohmic-contact layer 125" is formed at the upper portion of the ohmic-contact layer 125".

In this case, the gate pad electrode 126p is electrically connected with the lower gate pad line 116p via the gate pad part contact hole 140, and the pixel electrode 118 is connected with the drain electrode pattern 123' so as to be electrically connected with the drain electrode 123.

Herein, the third conductive film is made of a transparent conductive material with good transmittance such as indium-tin-oxide (ITO) or indium-zinc-oxide (IZO) to form the pixel electrode 118, the data pad electrode 127p and the gate pad electrode 126p. The fourth conductive film can be made of low-resistance opaque conductive material such as aluminum (Al), an aluminum alloy, tungsten (W), copper (Cu), chromium (Cr) and molybdenum (Mo), or the like to form the source electrode 122, the drain electrode 123 and the data line.

In the embodiment of the present invention, a tail of the active pattern formed of the amorphous silicon thin film does not exist at the lower portion of the data line 117, so there is no signal interference of the data line 117 possible by the tail and an aperture ratio increases by the width of the tail of the active pattern. In addition, because there is no tail of the active pattern, no wavy noise is generated, and thus, the LCD can have high picture quality. For reference, as mentioned above, the tail of active pattern is formed at the lower portion of the data line during the process of forming the active pattern, the source and drain electrodes and the data line by using the slit mask through the single making process, and because it has width wider than that of the data line, it causes the signal interference of the data line and degradation of an aperture ratio.

Figure 4F:
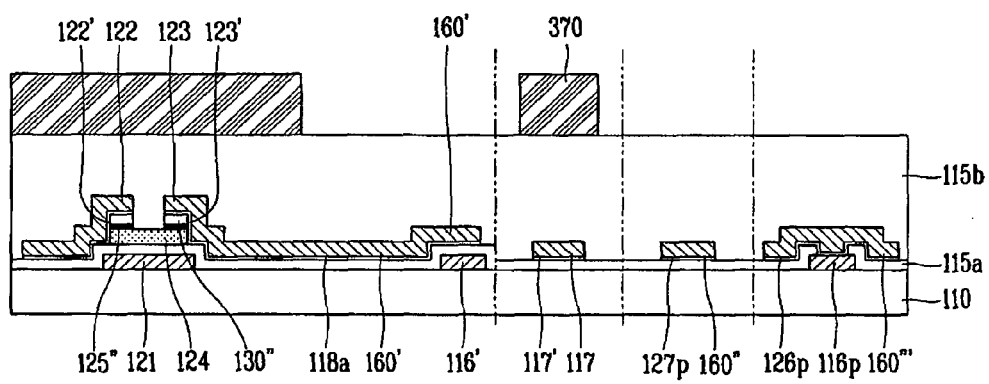
Figure 4G:
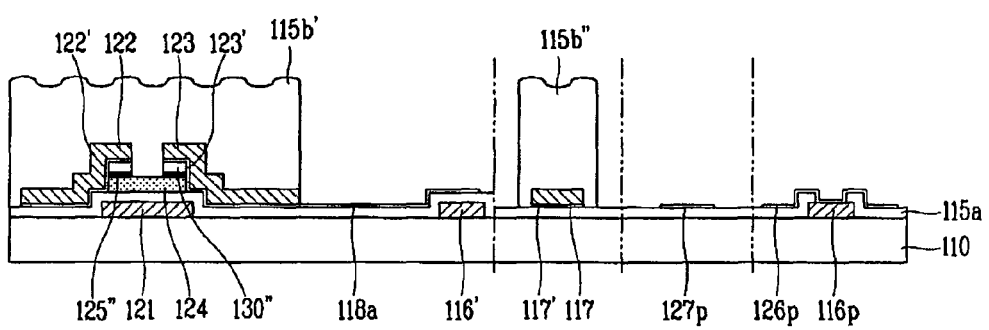
Figure 5D:
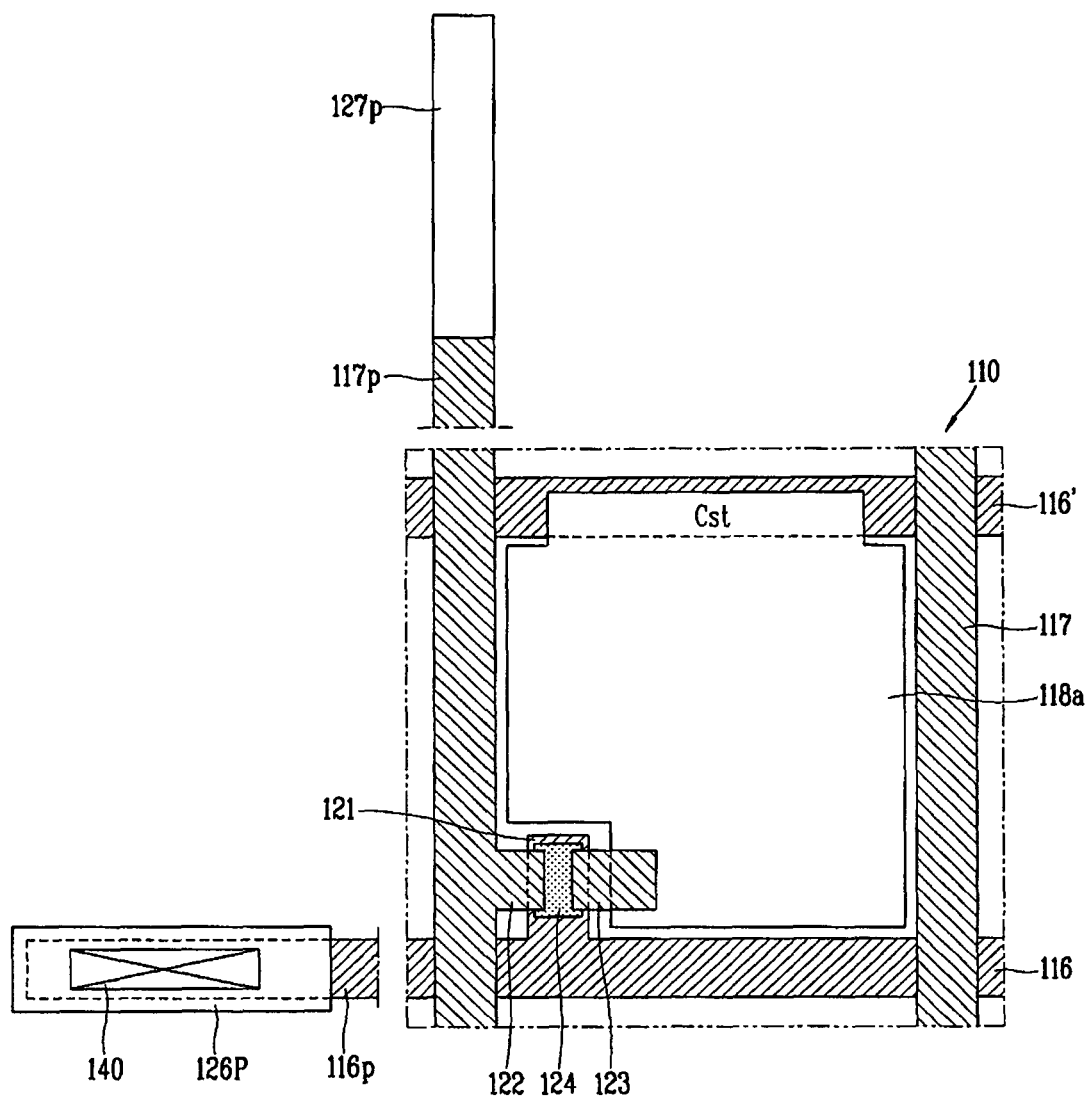

As shown in FIGS. 4F, 4G and 5D, the second insulation film 115b and a third photosensitive film 370, which has been patterned to have a certain form, are formed over the entire surface of the array substrate 110 and then the second insulation film 115b is selectively removed by using the photolithography process (a fourth masking process) to open the pixel region and the pad part. In this case, the second insulation film 115b may be formed of an organic film such as photoacryl to have a bumpy surface at the reflective portion. The bumpy surface serves to increase reflectivity of the reflective portion.

In this case, as mentioned above, because the pixel electrode 118a, the source electrode pattern 122', the drain electrode pattern 123', and the data line pattern 117', which are formed of the transparent conductive film, are formed underneath the source electrode 122, the drain electrode 123, and the data line 117, and the second insulation film 115b is formed on the source electrode 122 and the drain electrode 123, so the adhesion problem can be avoided between the second insulation film 115b and the transparent conductive films (namely, the pixel electrode 118a, the source electrode pattern 122', the drain electrode pattern 123', and the data line pattern 117').

The pixel electrode pattern 160', the data pad electrode pattern 160" and the gate pad electrode pattern 160'" are removed by using the fourth masking process to expose the pixel electrode 118, the data pad electrode 127p and the gate pad electrode 126p. A portion of the corresponding pixel electrode 118 overlaps with a portion of the previous gate line 116' to form a storage capacitor Cst together with the previous gate line 116' with the first insulation film 115a interposed therebetween.

Figure 4H:
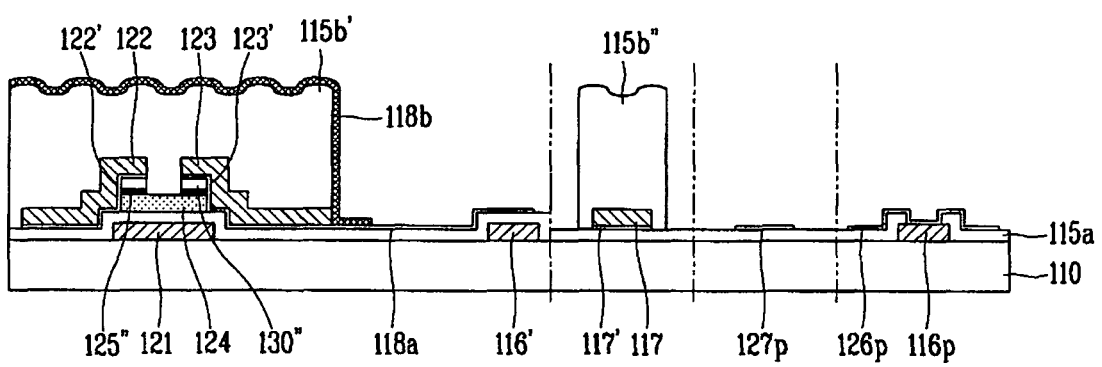
Figure 5E:
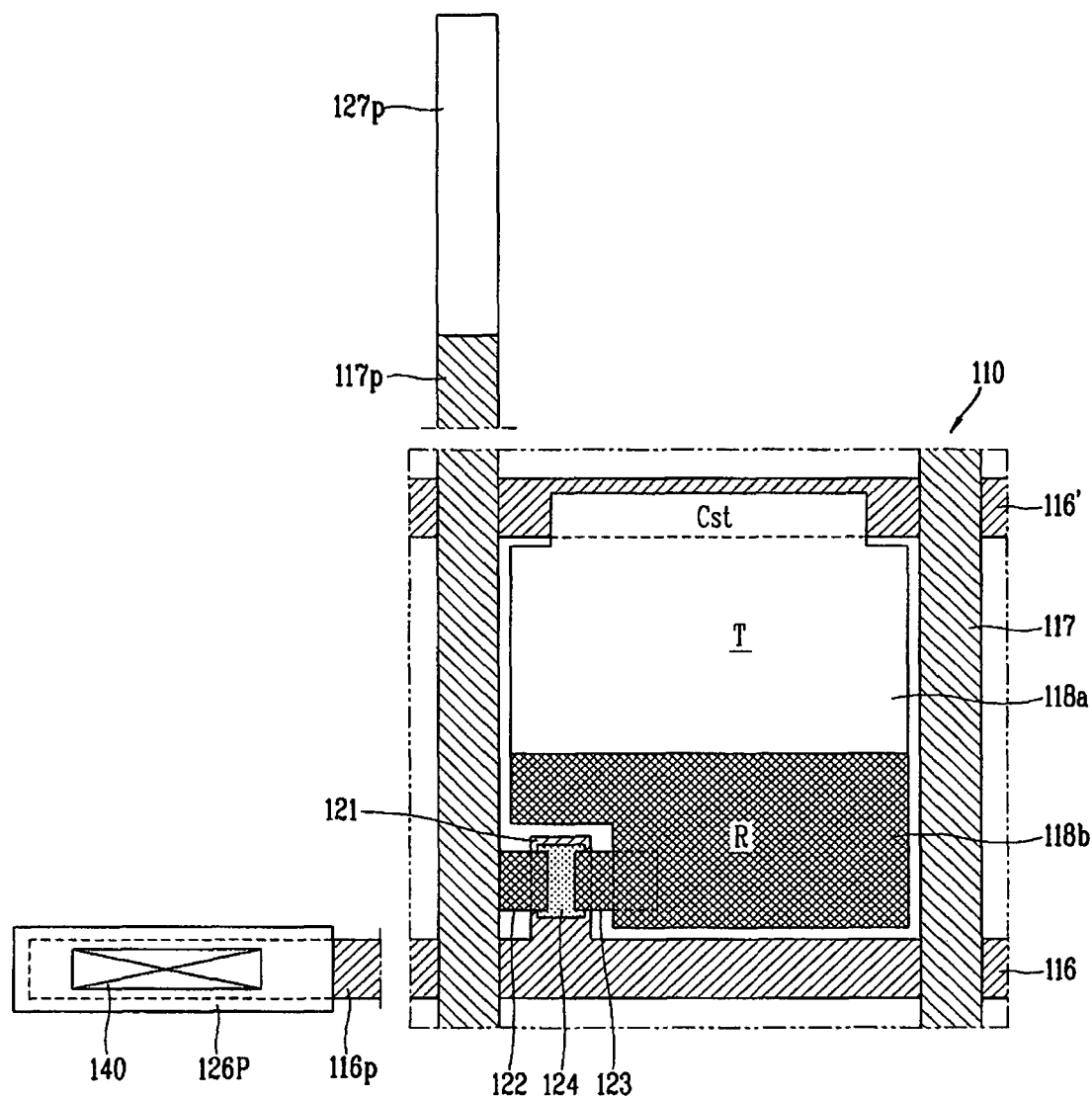

Thereafter, as shown in FIGS. 4H and 5E, a fifth conductive film is formed over the entire surface of the array substrate 110 and selectively removed by using the photolithography process (a fifth masking process) to form the reflective electrode 118b at the reflective portion.

The fifth conductive film may be made of a conductive material with good reflectivity such as aluminum to form the reflective electrode 118b.

The array substrate according to the embodiment of the present invention is attached with color filter substrates in a facing manner by a sealant applied to outer edges of the image display part. In this case, the color filter substrates include black matrixes for preventing leakage of light to the TFTs, the gate lines and the data lines and color filters for implementing red, green and blue colors.

The attachment of the color filter substrates and the array substrates are made through attachment keys formed on the color filter substrates or the array substrates.

In the embodiment of the present invention, as the active patterns, the amorphous silicon TFT using the amorphous silicon thin film is used as an example, but the present invention is not limited thereto and as the active patterns, polycrystalline silicon TFTs using a polycrystalline silicon thin film can be also used.

The present invention can be also applied to a different display device fabricated by using TFTs, for example, an OLED (Organic Light Emitting Diode) display device in which OLEDs are connected with driving transistors.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A transflective liquid crystal display device comprising:
a first substrate divided into a pixel part and first and second pad parts;
a gate electrode and a gate line formed of a first conductive film at the pixel part of the first substrate;
a first insulation film formed on the first substrate with the gate electrode and a gate line formed thereon;
an active pattern formed as an island at an upper portion of the gate electrode, wherein the active pattern is flat owing to having a width smaller than the gate electrode;
a flat type of an ohmic-contact layer formed of an n+ amorphous silicon thin film on the active pattern;
a flat type of a barrier metal layer formed of a second conductive film at an upper portion of the ohmic-contact layer,
wherein the barrier metal layer is a single layer, is substantially patterned in the same size as the ohmic-contact layer and an entire lower portion of the barrier metal layer contacts with the ohmic-contact layer;
source and drain electrodes formed of a fourth conductive film over the barrier metal layer and electrically connected with source and drain regions of the active pattern via the ohmic-contact layer and the barrier metal layer;
a data line formed at the pixel part of the first substrate and crossing the gate line to define a pixel region including a reflective portion and a transmissive portion;
a pixel electrode formed of a third conductive film at the transmissive portion of the pixel region and electrically connected with the drain electrode;
a source electrode pattern, a drain electrode pattern and a data line pattern formed of the third conductive film at lower portions of the source electrode, the drain electrode and the data line, respectively,
wherein the barrier metal layer reduces contact resistance between the ohmic-contact layer and the source/drain electrode patterns and
wherein an entire upper portion of the barrier metal layer contacts with the source/drain electrode patterns;
a second insulation film exposing the pixel electrode of the pixel region on the first substrate with the source and drain electrodes formed thereon;
a reflective electrode formed of a fifth conductive film at the reflective portion of the pixel region and electrically connected with the drain electrode and the pixel electrode; and
a second substrate attached to the first substrate in a facing manner.

2. The device of claim 1, further comprising:
a gate pad line formed at the first pad part of the first substrate.

3. The device of claim 2, further comprising:
a contact hole formed by removing a portion of the first insulation film, and exposing a portion of the gate pad line.

4. The device of claim 3, further comprising:
a gate pad electrode electrically connected with the gate pad line via the contact hole.

5. The device of claim 1, wherein the second conductive film is made of a low resistance conductive material such as molybdenum.

6. The device of claim 1, wherein the second conductive film has a thickness of about 50 Å to 100 Å.

7. The device of claim 1, wherein the source electrode pattern, the drain electrode pattern and the data line pattern are patterned in the same form as the source electrode, the drain electrode, and the data line.

8. The device of claim 1, further comprising:
a data pad line formed at the second pad part of the first substrate.

9. The device of claim 8, further comprising:
a data pad electrode formed at the second pad part of the first substrate and electrically connected with the data pad line.

10. The device of claim 1, wherein a portion of the second insulation film is removed to expose the pixel electrode of the pixel region.

11. The device of claim 1, wherein the second insulation film is formed to have a bumpy surface.

12. The device of claim 1, wherein the second insulation film is made of an organic film such as photoacryl.

* * * * *